(12) United States Patent
Polsdorf et al.

(10) Patent No.: US 8,837,291 B2
(45) Date of Patent: *Sep. 16, 2014

(54) MESH NETWORK CONNECTING WIRELESS ROUTERS

(75) Inventors: Thomas G. Polsdorf, San Diego, CA (US); Cuong Pham, San Diego, CA (US); Anand Gore, San Diego, CA (US); Dirk DeSchepper, Herentals (BE); Ulf Soderberg, Taby (SE)

(73) Assignee: Novatel Wireless, Inc., San Diego, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/562,034

(22) Filed: Jul. 30, 2012

(65) Prior Publication Data

US 2012/0294260 A1 Nov. 22, 2012

Related U.S. Application Data

(60) Division of application No. 12/110,166, filed on Apr. 25, 2008, now Pat. No. 8,233,396, which is a continuation of application No. 11/855,981, filed on Sep. 14, 2007, now abandoned.

(51) Int. Cl.
*H04W 40/00* (2009.01)
*H04W 40/04* (2009.01)
*H04W 84/18* (2009.01)
*H04L 12/729* (2013.01)
*H04W 40/12* (2009.01)

(52) U.S. Cl.
CPC .............. *H04W 40/04* (2013.01); *H04W 84/18* (2013.01); *H04L 45/125* (2013.01); *H04W 40/12* (2013.01)

USPC ........... 370/237; 370/219; 370/220; 370/221; 370/225; 370/238; 370/310.2; 370/338; 370/401; 370/406; 455/8; 455/422.1; 455/445; 709/239; 709/240; 709/241; 709/244; 379/221.01; 379/272

(58) Field of Classification Search
CPC .................................................. H04W 28/021
USPC .................. 370/217–221, 225–228, 237, 238, 370/310.2, 328–339, 349, 401, 406; 455/8, 455/422.1, 445; 709/239–241, 244; 379/221.01, 221.02, 221.03, 221.04, 379/272–274

See application file for complete search history.

(56) References Cited

U.S. PATENT DOCUMENTS

| 5,737,526 A | 4/1998 | Periasamy et al. |
| 6,400,946 B1 | 6/2002 | Vazvan et al. |
| 7,933,266 B2 | 4/2011 | Zadikian et al. |
| 8,233,396 B2 | 7/2012 | Polsdorf et al. |

(Continued)

OTHER PUBLICATIONS

Non-Final Office Action dated Dec. 18, 2013, in related U.S. Appl. No. 13/078,812.

(Continued)

*Primary Examiner* — Hoon J Chung
(74) *Attorney, Agent, or Firm* — AlbertDhand LLP

(57) ABSTRACT

A communication routing arrangement includes two or more wireless routers coupled to a communication network, and a user device adapted to couple with the communication network through a communication path including at least one of the two or more wireless routers. The communication path between the user device and the communication network is selected based on available resources of the two or more wireless routers.

11 Claims, 4 Drawing Sheets

(56) References Cited

U.S. PATENT DOCUMENTS

| | | |
|---|---|---|
| 2004/0157613 A1 | 8/2004 | Steer et al. |
| 2005/0036505 A1* | 2/2005 | Frei et al. ................. 370/442 |
| 2007/0104123 A1 | 5/2007 | Tomici et al. |
| 2007/0161401 A1* | 7/2007 | Sheynblat ................. 455/553.1 |
| 2008/0002652 A1 | 1/2008 | Gupta et al. |

OTHER PUBLICATIONS

Non-Final Office Action dated Dec. 13, 2013, in related U.S. Appl. No. 13/159,321.

Non-Final Office Action dated Jan. 10, 2014, in related U.S. Appl. No. 13/562,052.

* cited by examiner

-- PRIOR ART --

MESH NETWORK CONNECTING WIRELESS ROUTERS

CROSS-REFERENCE TO RELATED APPLICATIONS

This application is a divisional of U.S. patent application Ser. No. 12/110,166, filed Apr. 25, 2008, which is a continuation of U.S. patent application Ser. No. 11/855,981, filed Sep. 14, 2007, which is incorporated herein by reference.

BACKGROUND OF THE INVENTION

The present invention relates generally to the field of communication devices and, more particularly, to systems, methods, arrangements and devices associated with wireless routers.

Much of the network communication today is routed at least partially through wireless routers. For example, in a large office building, wireless routers may be positioned throughout the building to provide network access to user devices equipped with wireless modems.

FIG. 1 illustrates one such arrangement. In the system 100 illustrated in FIG. 1, a communication network 110 may be accessible to numerous users. The communication network 110 may be a computer network, such as a local area network (LAN) or a wide area network (WAN), for example. A wireless router 120 may be positioned in the office building or in the general vicinity of a user with a user device 130 which may be a desktop computer, a laptop computer, a personal digital assistant (PDA) or other handheld device. Thus, the user device 130 wirelessly communicates with the wireless router 120, which in turn allows communication with the communication network 110.

Problems may arise if the user device 130 and the wireless router 120 are positioned such that the wireless signal strength between the wireless router 120 and the user device 130 is weak. Further problems may arise if there are too many user devices utilizing the limited bandwidth of the wireless router 120. Providing high-capacity access to users in certain regions, such as remote regions, may also be costly.

SUMMARY OF THE INVENTION

One aspect of the invention relates to a communication routing arrangement. The arrangement includes two or more wireless routers coupled to a communication network, and a user device adapted to couple with the communication network through a communication path including at least one of the two or more wireless routers. The communication path between the user device and the communication network is selected based on available resources of the two or more wireless routers.

In one embodiment, the available resources include available bandwidth and/or signal strength.

In one embodiment, the two or more wireless routers are arranged in a mesh network. The two or more wireless routers may communicate with each other in a master/slave relationship. The master/slave relationship may be predetermined. The master/slave relationship may be hierarchical. Alternatively, the master/slave relationship may be determined in real time.

In one embodiment, the communication routing arrangement further includes a multiplexer coupled to the two or more wireless routers and positioned in the communication path between the two or more routers and the user device. The multiplexer may be adapted to select the communication path. The multiplexer may be adapted to select one or more routers for uploading to the network and one or more routers for downloading to the user device. The multiplexer may be adapted to form a virtual mesh network of the two or more wireless routers.

In another aspect of the invention, a router multiplexer includes inputs adapted to couple to two or more wireless routers for communication with a communication network, an output for coupling to a user device, and a multiplexing module adapted to select a communication path between the user device and the communication network based on available resources of the two or more wireless routers.

DETAILED DESCRIPTION OF THE PREFERRED EMBODIMENTS

Embodiments of the present invention enhance wireless communication between a user device and a network through the use of two or more wireless routers. Each router is preferably separately connected to the network. The two or more wireless routers may be used in numerous manners to improve the communication.

Figure 1:
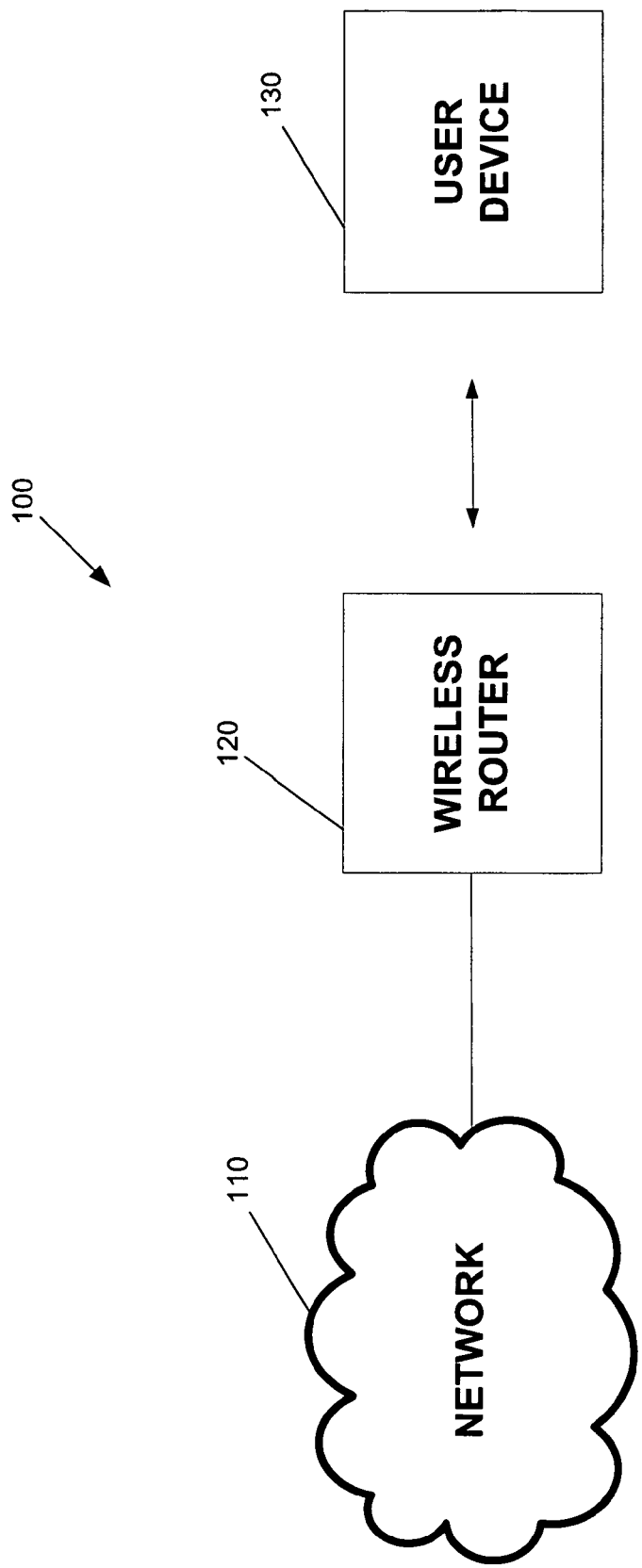
FIG. 1 is a block diagram illustrating a prior art wireless communication arrangement.
Figure 2:
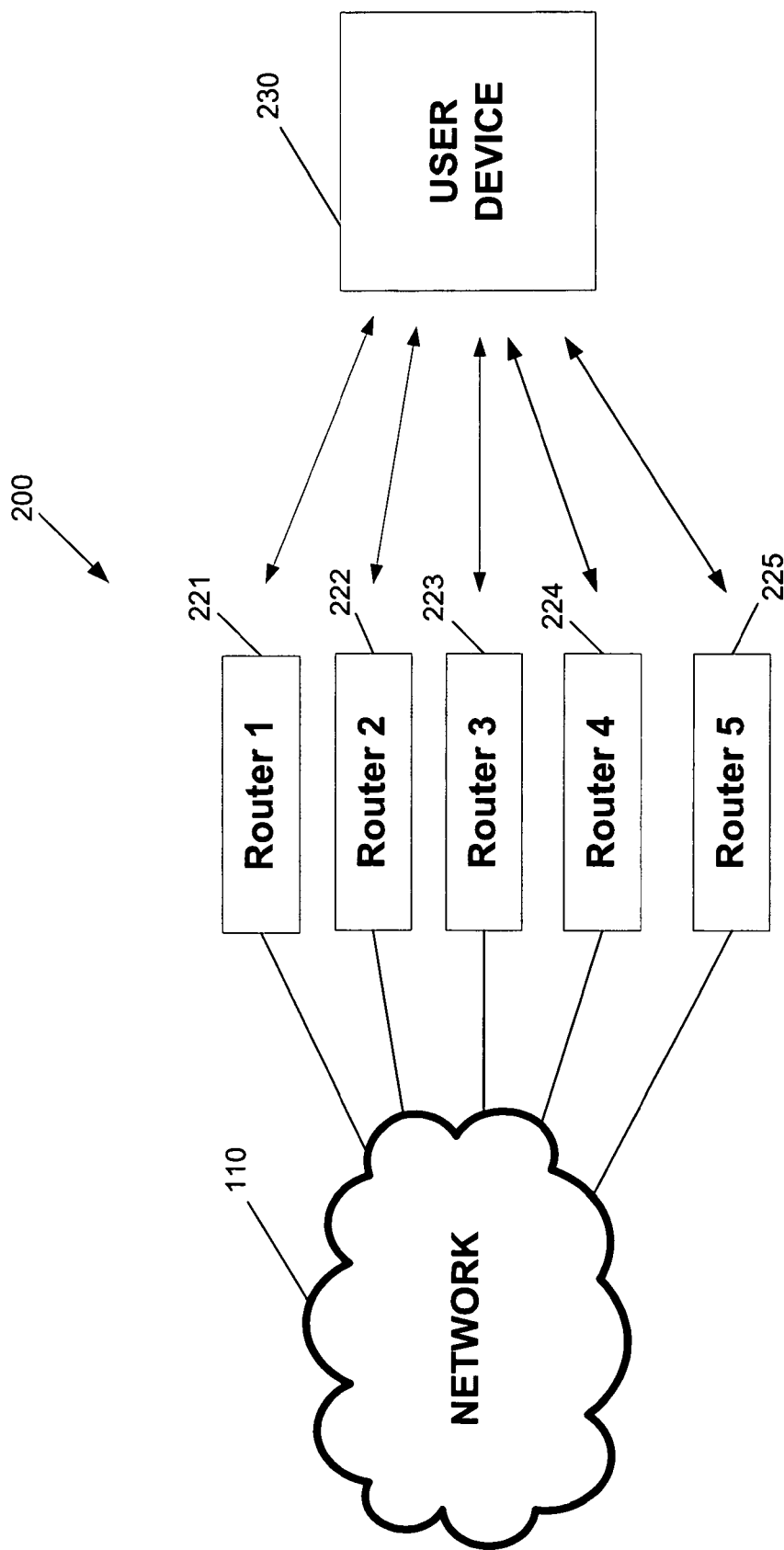
FIG. 2 is a block diagram illustrating a wireless communication arrangement according to an embodiment of the present invention.

Referring now to FIG. 2, a block diagram of an exemplary wireless communication arrangement according to an embodiment of the invention is illustrated. In the system 200 illustrated, a communication network 110 may be accessible to one or more users, such as a user with a user device 230. The user device 230 may be a desktop computer, a laptop computer, a personal digital assistant (PDA), a portable phone, other handheld device, or any other communication device. The communication network 110 may be a computer network, such as a local area network (LAN), a wide area network (WAN) or a public network, such as the Internet, for example. Further, the communication network 110 may be a wireless phone network, such as a cellular network.

A plurality of wireless routers 221-225 are positioned in the general vicinity of the user device 230. The wireless routers may be third-generation (3G) wireless routers. The routers 221-225 may be independently positioned at various locations in the general vicinity. For example, the routers 221-225 may be distributed throughout a building, a district or a city. Alternatively, the routers 221-225 may be positioned as a single bundle. Further, the routers 221-225 may be identical routers or different routers. In one embodiment, the routers are adapted for a maximum data rate of 1.8 Mbps. Further, the routers may be associated with one or more networks. For example, the first router 221 may be associated with an Ethernet, while the second router 222 may be associated with an Evolution-Data Optimized (EVDO) network.

The user device 230 may communicate with the communication network 110 through one or more of the routers 221-225. In one embodiment, the user device 230 may determine the resources available from each router 221-225. The resources may include signal strength and bandwidth, for example. Upon determination of the available resources from each router 221-225, the user device 230 may select a communication path with the communication network 110. Accordingly, the user device 230 may select one or more of the routers 221-225 for communication with the communication network 110.

In one embodiment, the bandwidth of two or more of the routers 221-225 may be combined to provided greater capacity to the user device 230. The combining of the routers 221-225 may be accomplished by linking two or more of the routers 221-225. In this regard, the resources of the two or more routers 221-225 may be bundled to provide greater capacity.

Alternatively, the routers 221-225 may be virtually combined by the user device 230. In this regard, the user device 230 may select two or more routers 221-225 based on the available resources. For example, the user device 230 may select two routers with excellent signal strength and available bandwidth. The user device 230 may be provided with software to enable the user device 230 to user two or more routers for the communication. Thus, if two of the routers 221-225 each have a maximum data rate of 1.8 Mbps, the two routers may be combined to provide the user device 230 with a bandwidth of up to 3.6 Mbps.

Further, although the system 200 of FIG. 2 illustrates the routers 221-225 directly connected to the network 110, in some embodiments, the routers 221-225 may be associated with other networks through which communications are routed to the network 110.

Figure 3:
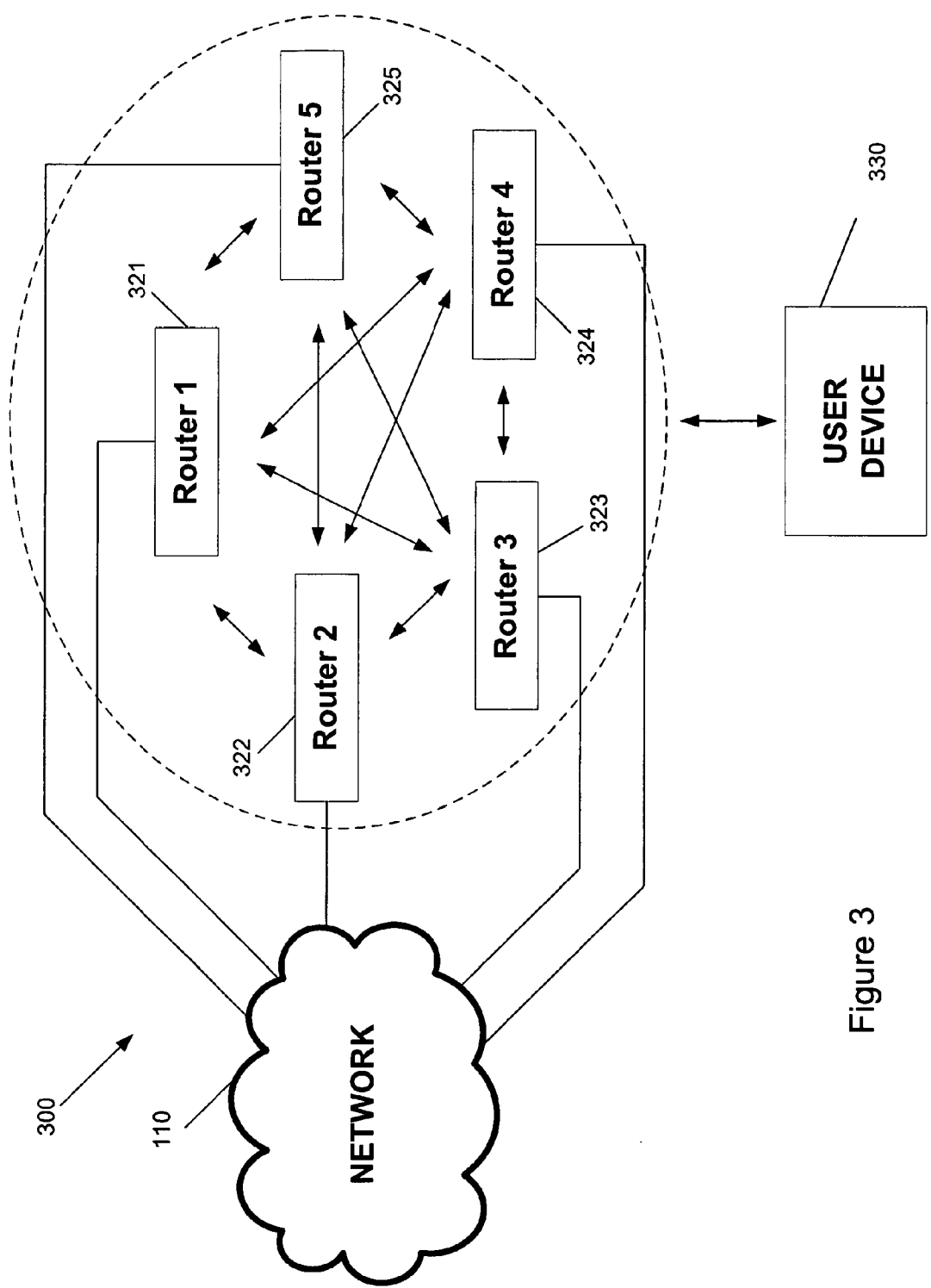
FIG. 3 is a block diagram illustrating a wireless communication arrangement according to another embodiment of the present invention.

Referring now to FIG. 3, a block diagram of a wireless communication arrangement according to another embodiment of the present invention is illustrated. In the embodiment of FIG. 3, the arrangement 300 includes a plurality of wireless routers 321-325 configured as a mesh network 320. Each of the routers 321-325 in the mesh network 320 is separately coupled to the communication network. In this regard, the communication may be directed through the mesh network 320 to avoid congestion in a particular router, for example.

The direction of the communication through the mesh network 320 may be controlled in any of numerous manners. The mesh network 320 may be configured according to IEEE 802.11b/g. In one embodiment, software may be provided to dynamically route the communication traffic through routers that provide the best bandwidth and/or signal strength. Such software may be similar to that used in typical Internet routing. In this regard, the software may be adapted to discover routers that provide the best bandwidth by employing algorithms and/or heuristics. For example, in one embodiment, the software may be configured to query each router for signal strength.

The software may be implemented on each router 321-325. In one embodiment, each router may be capable of communicating with another router in a slave/master relationship. The slave/master relationship may be based on predetermined relationships or may be determined in real time. The routers may be configured in a hierarchical relationship. In this regard, as an example, a first router 321 may be configured as a master to each of the other routers 322-325, while the second router 322 may be a slave to the first router 321 and a master to the remaining routers 323-325.

From the perspective of the user device 330, the mesh network 320 functions as a single router with a high capacity. Thus, a communication path between the user device and the communication network is selected based on available resources of the two or more wireless routers to provide greater bandwidth or improved signal strength, for example.

Figure 4:
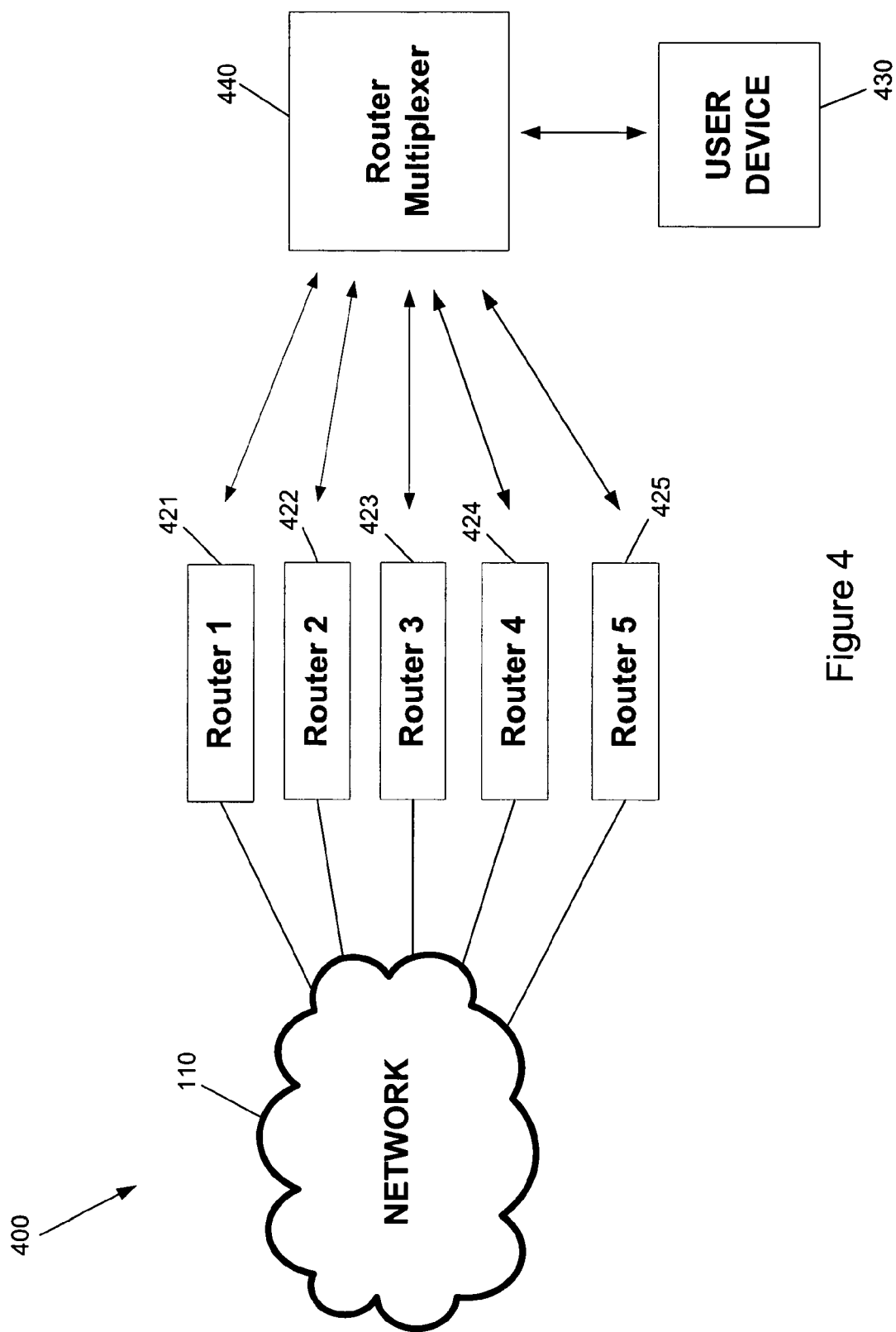
FIG. 4 is a block diagram illustrating a wireless communication arrangement according to still another embodiment of the present invention.

In another embodiment, as illustrated in FIG. 4, a wireless communication arrangement 400 may include a router multiplexer 440 to facilitate communication between a user device 430 and the communication network 110. The router multiplexer 440 is adapted to provide the user device 430 with access to two or more wireless routers 421-425 for communication with the network 110. In this regard, the router multiplexer 440 may include two or more inputs for coupling the router multiplexer 440 to the wireless routers 421-425 and one or more outputs for coupling to the user device 430.

The inputs may be adapted to wirelessly link to the routers 421-425. Alternatively, the inputs may provide a direct, wired link to the routers 421-425. In this regard, the router multiplexer 440 may provide inputs, such as slots, for connection of multiple routers thereto.

Similarly, the outputs may provide a wireless link to the user device 430. Alternatively, the router multiplexer 440 may be formed as a module within the user device 430 or may be a peripheral for the user device 430.

Further, the router multiplexer 440 may include a multiplexing module configured with the software described above. In one embodiment, the multiplexing module may be configured to form a virtual mesh network of the routers 421-425. In this regard, although the routers 421-425 are not directly in communication with one another, the multiplexing module of the router multiplexer 440 may allow such communication.

In one embodiment, the router multiplexer 440 is a router itself capable of connecting to other routers and managing the selection of the communication path.

In the various embodiments described above, software or hardware may be adapted to select a communication path between the user device and the communication network based on available resources of the two or more wireless routers.

In one embodiment, the selection of a communication path between the user device and the network may include selecting different routers for each direction of communication. For example, the resources of one or more wireless router may be selected for downloading signals from the communication network to the user device, while the resources of other wireless router(s) may be selected for uploading signals from the user device to the communication network.

Thus, embodiments of the present invention allow a user device to experience improved connectivity with a network, including greater bandwidth and/or improved signal strength. Further, high-capacity access may be provided at a reduced cost to remote locations, for example.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. A communication routing system, comprising:
   two or more wireless routers coupled to a communication network;
   a user device configured to couple with the communication network through a communication path including at least one of the two or more wireless routers;
   a multiplexer coupled to the two or more wireless routers and positioned in the communication path between the two or more wireless routers and the user device, wherein the two or more wireless routers are not in direct communication with each other and the multiplexer is configured to communicate with either one of the two or more wireless routers at a time or a plurality of the two or more wireless routers simultaneously such that the communication path between the user device and the communication network is selected based on available resources of the two or more wireless routers, wherein the multiplexer is configured to select one or more wireless routers of the two or more wireless routers for uploading to the communication network and another one or more wireless routers of the two or more wireless routers for downloading to the user device and wherein the two or more wireless routers are arranged in a mesh network.

2. The communication routing arrangement of claim 1, wherein the two or more wireless routers communicate with each other in a master/slave relationship.

3. The communication routing arrangement of claim 2, wherein the master/slave relationship is predetermined.

4. The communication routing arrangement of claim 3, wherein the master/slave relationship is hierarchical.

5. The communication routing arrangement of claim 2, wherein the master/slave relationship is determined in real time.

6. The communication routing arrangement of claim 1, wherein the available resources include available bandwidth and/or signal strength.

7. The communication routing arrangement of claim 1, wherein the multiplexer is adapted to select the communication path.

8. The communication routing arrangement of claim 1, wherein the two or more wireless routers are associated with one or more networks.

9. The communication routing arrangement of claim 8, wherein the one or more networks include an Ethernet or Evolution-Data Optimized (EVDO) network.

10. The communication routing system of claim 1, wherein the user device communicates to the communication network through the plurality of two or more wireless routers simultaneously combining resources of the plurality of two or more wireless routers thus increasing the available bandwidth between the user device and the communication network.

11. The communication routing system of claim 1, wherein resources of the two or more wireless routers are combined to provide greater capacity to the user device.

* * * * *